ic distillation with an alkane diol

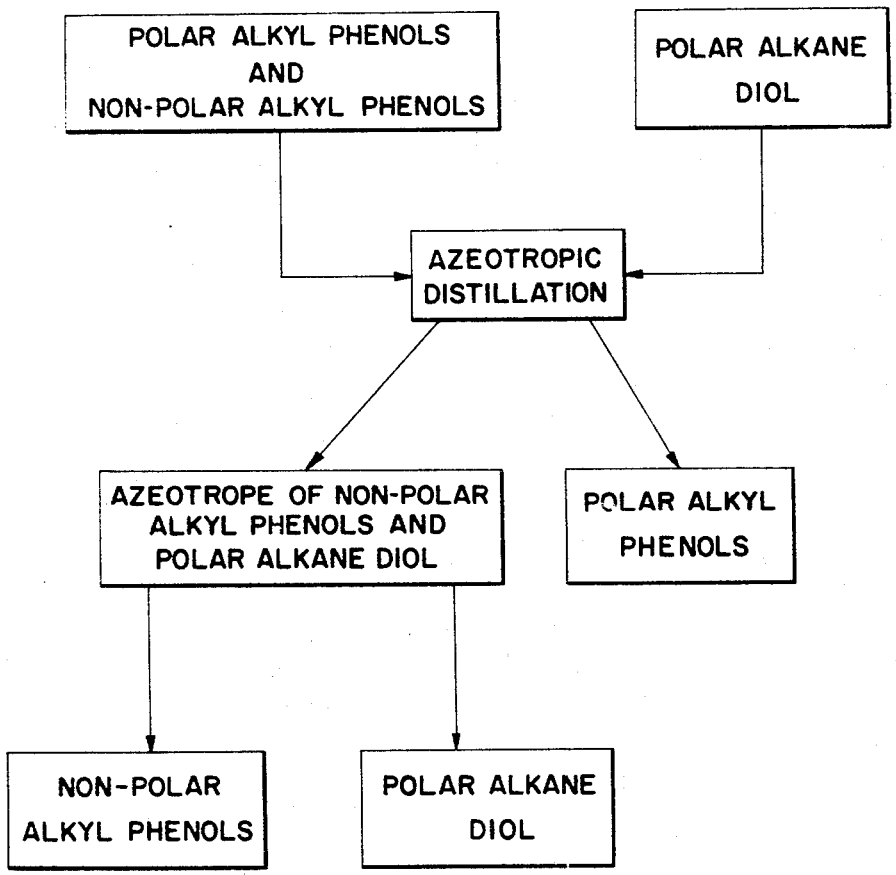

3,392,090
PROCESS FOR SEPARATION OF ALKYL PHENOLS BY AZEOTROPIC DISTILLATION WITH AN ALKANE DIOL
Louis L. Parisse, Oil City, Pa., assignor to Koppers Company, Inc., a corporation of Delaware
Filed Dec. 9, 1966, Ser. No. 600,603
9 Claims. (Cl. 203—64)

ABSTRACT OF THE DISCLOSURE

Nonpolar or sterically hindered alkyl phenols preferentially azeotrope with a polar alkane diol. Subsequent distillation separates the azeotroped alkyl phenol from more polar alkyl phenols. The diol selected as an azeotropic agent should have a boiling point within 20° C. of the alkyl phenol with which it is to azeotrope.

Background of the invention

This invention relates to a process for the separation and purification of alkyl phenols having close boiling points but differing degrees of polarity by adding an azeotroping agent which preferentially azeotropes at least one of the alkyl phenols.

Mono and polymethyl phenols are naturally occurring phenols found in coal tar distillates such as derived from bituminous coal. Dimethyl phenols, as well as trimethyl phenols, are also obtained as by-products in the alkylation of phenol to produce 2-methyl phenol (o-cresol). The dimethyl phenols exist in six isomeric forms, as do also the trimethyl phenols.

Certain of the methyl phenol isomers are valuable as intermediates for the synthesis of, for example, antioxidants, while others may be used as polymerizable monomers. For example, 2,6-dimethyl phenol is a valuable isomer which is used in the preparation of aromatic polyethers such as polyphenylene oxide. It is therefore desirable to obtain the isomer in a highly purified form. Unfortunately, when 2,6-dimethyl phenol is produced synthetically or is produced from coal tar distillates, monomethyl phenols (cresols) are present. For example, when 2,6-dimethyl phenol is present in what is called the cresol distillate or fraction of coal tar by-product—named for the monomethyl phenols (cresols) which are in this fraction—it is almost impossible to separate the 3-methyl phenol and 4-methyl phenol from the dimethyl phenol by ordinary distillation techniques due to the close boiling points of the compounds. (201° C. for 2,6-dimethyl phenol, 202.8° C. for 3-methyl phenol and 202.5° C. for 4-methyl phenol.)

Summary of the invention

It has now been discovered that alkyl phenol mixtures having very close boiling points but differing degrees of polarity may be separated by the addition of an alkane diol azeotroping agent to the mixture.

In accordance with the invention, alkyl phenols having close boiling points but differing degrees of polarity are separated by:
(a) adding to a mixture of alkyl phenols, wherein at least one alkyl phenol is less polar than the others, an alkane diol having from 2–6 carbon atoms and having a boiling point within ±20° C. of the less polar alkyl phenol to form an azeotrope of the diol and the less polar alkyl phenol; and (b) distilling the mixture to separate the azeotrope from the more polar alkyl phenols.

Detailed description

While the exact mechanism by which the diol preferentially azeotropes with one of the alkyl phenols is not completely understood, it is believed that the diol, being a polar molecule, is preferentially attracted to the least polar alkyl phenol, for example, to 2,6-dimethyl phenol rather than 3-methyl phenol or 4-methyl phenol due to the steric hindrance and thus low polarity of the 2,6-dimethyl phenol.

Diols which are useful in the practice of the invention are defined herein to mean dihydroxy alkanes having from 2–6 carbon atoms. Examples of such diols include ethylene glycol, 1,2-propanediol, 1,3-butanediol, 1,4-butanediol, and the like.

The diol should have a boiling point within about 20° C. of the alkyl phenol with which it is to azeotrope and preferably the boiling point difference should be about 10° C. For example, when 2,6-dimethyl phenol (B.P. 201° C.) is to be separated from 3-methyl phenol (B.P. 202.8° C.) and 4-methyl phenol (B.P. 202.5° C.) the diol selected to azeotrope with the 2,6-dimethyl phenol should have a boiling point between 181° C. and 221° C., preferably in the range of about 190–210° C. Thus, ethylene glycol (B.P. 197° C.) or 1,2-propanediol (B.P. 189° C.) are used rather than 1,4-butanediol (B.P. 230° C.). However, when higher boiling alkyl phenols such as for example, 2,3,6-trimethyl phenol (B.P. 220° C.), the lower boiling diols mentioned above are not effective.

The diol should be present in an amount in weight ratio that is at least equal to the weight of alkyl phenol with which it is to azeotrope. Ratios of 3 parts diol to 1 part alkyl phenol or even higher may be used. The amount of diol necessary can usually be determined with reference to the percent of the alkyl phenol to be removed from the mixture and amounts in excess of this amount are unnecessary. The composition of the azeotrope is however not constant but has been found to be dependent upon the pressure at which the distillation is carried out. The distillation may be carried out at under vacuum conditions or at super-atmospheric pressures. The preferred range is from 50 mm. Hg to about atmospheric pressure.

The diol is later separated from the phenol component of the azeotrope by conventional separation techniques well known to those skilled in the art—as, for example, by steam distillation or crystallization.

The accompanying flow sheet and the following examples will serve to further illustrate the practice of the invention.

EXAMPLE I

To a distillation kettle was charged 150 grams of ethylene glycol and 100 grams of a mixture of alkyl phenols containing approximately:

| | Percent |
|---|---|
| 2,6-dimethyl phenol | 90–91 |
| 2-methyl phenol (o-cresol) | 3 |
| 3-methyl phenol and 4-methyl phenol (m-, p-cresol) | 6–7 |
| Total | 100 |

Distillation was run on a 2 ft. helix-packed column at a reflux ratio of 19:1. At equilibrium 0.5 ml. of distillate was discarded before taking 0.5 ml. samples for analysis.

The composition of the azeotrope vs. pressure is given in Table I below:

TABLE I

| | Pressure (mm. Hg) | Boiling Point (centigrade) | Vapor Phase Chromatography (VPC) Analysis | | |
|---|---|---|---|---|---|
| | | | Ethylene glycol | 2,6-dimethyl phenol | 2-methyl phenol |
| 1 | 25 | 102 | 20.1 | 79.4 | 0.5 |
| 2 | 50 | 116 | 23.9 | 75.7 | 0.4 |
| 3 | 100 | 132 | 27.5 | 72.1 | 0.3 |
| 4 | 200 | 149 | 31.8 | 67.9 | 0.3 |
| 5 | 735 | 189 | 40.0 | 59.7 | 0.2 |

Because of the higher 2,6-dimethyl phenol to ethylene glycol ratio at lower pressures, the residue was distilled at 50 mm. Hg and the course of the distillation followed by VPC analysis of the fractions as shown in Table II below:

TABLE II

| Fraction | Boiling Point (° C.) at 50 mm. Hg | Weight (g.) | Weight Percent (Σ) | VPC Analysis, Area Percent | | | |
|---|---|---|---|---|---|---|---|
| | | | | Ethylene Glycol | 2,6-dimethyl phenol | 2-methyl phenol | 3-methyl phenol, 4-methyl phenol |
| 1 | <116 | 20.4 | 8.9 | 23.3 | 76.2 | 0.4 | |
| 2 | 116–117 | 21.0 | 18.1 | 23.4 | 76.2 | 0.4 | |
| 3 | 117–119 | 20.3 | 26.9 | 24.1 | 75.3 | 0.6 | |
| 4 | 115–117 | 21.1 | 36.1 | 21.2 | 78.0 | 0.9 | |
| 5 | 115–119 | 20.6 | 45.1 | 22.6 | 73.8 | 1.1 | 0.1 |
| 6 | 119–126 | 21.5 | 54.5 | 59.6 | 12.7 | 4.5 | 24.9 |
| 7 | 126–127 | 21.6 | 63.9 | 96.2 | 0.6 | 0.5 | 3.3 |
| 8 | 127 | 22.6 | 73.8 | 99.4 | 0.5 | | 0.1 |
| 9 | 127 | 28.5 | 86.2 | 100 | | | |
| Residue | | 31.6 | 100 | 100 | | | |
| | | 229.2 | | | | | |

Fractions 1–5 were combined together and the glycol was separated from the phenols by the addition of 150 ml. of water followed by lowering of the temperature to about 4–5° C. to crystallize out the 2,6-dimethyl phenol. 72 grams of 2,6-dimethyl phenol (80% yield) were recovered of 99% purity.

While the foregoing example illustrates the azeotropic separation of the invention, it should be noted that the 2-methyl phenol content in the fractions containing the 2,6-dimethyl phenol was much higher than the 3-methyl phenol and 4-methyl phenol isomers. This can be accounted for by examining the relative positioning of the methyl group of each isomer with respect to the hydroxyl group. The 2-methyl phenol having the methyl group on a carbon atom adjacent the hydroxyl-containing carbon atom, is thus less polar than the 3-methyl phenol and 4-methyl phenol. The polar diol azeotroping agent may therefore be attracting some 2-methyl phenol as well as 2,6-dimethyl phenol. However, since the boiling point of 2-methyl phenol is only 191.5° C., an ordinary fractional distillation is not out of the question as is the case with the other monomethyl phenol isomers which boil within 1–2° C. of 2,6-dimethyl phenol. To illustrate the degree of 2,6-dimethyl phenol purity attainable by a conventional fractionation to remove 2-methyl phenol followed by the azeotropic separation of the invention, the following example was carried out.

EXAMPLE II

To a distillation kettle was charged 1039 grams of mixed alkyl phenols as follows:

| | Percent |
|---|---|
| 2,6-dimethyl phenol | 91.7 |
| 2-methyl phenol | 2.2 |
| 3-methyl phenol and 4-methyl phenol | 6.1 |
| Total | 100.0 |

A 3 ft. helix-packed distillation column was attached to the kettle and distillation commenced at a 20:1 reflux ratio. After removal of about 44 grams, the reflux ratio was raised to 30:1. A total of 90 grams of distillate (containing the lower boiling 2-methyl phenol) was removed.

The residue was then analyzed by vapor phase chromatography and found to contain:

| | Percent |
|---|---|
| 2,6-dimethyl phenol | 93.1 |
| 2-methyl phenol | 0.1 |
| 3-methyl phenol and 4-methyl phenol | 6.8 |
| Total | 100.0 |

About 100 grams of this residue was charged to the distillation kettle with 150 grams of ethylene glycol. A 2 ft. helix-packed column was fitted to the kettle and the distillation commenced at 50 mm. Hg pressure and 19:1 reflux ratio. 98 grams of distillate boiling at 115–119° C. were collected. Both distillate and residue were analyzed as follows:

| | Ethylene Glycol | 2,6-dimethyl phenol | 2-methyl phenol | 3-methyl phenol, 4-methyl phenol |
|---|---|---|---|---|
| Distillate, 98 grams | 25% (24.3 grams) | 75% (74 grams) | Trace | Trace. |
| Residue, 152 grams | 82.7% (125.7 grams) | 12.5% (19 grams) | .3% (.1 gram) | 4.5% (6.8 grams). |

The distillate was combined with 150 ml. of water and the temperature lowered to 5° C. to crystallize out the 2,6-dimethyl phenol. About 56 grams of essentially 100% 2,6-dimethyl phenol was recovered.

Similar results were achieved using 1,2-propanediol (B.P. 189° C.) and 1,3-butanediol (B.P. 204° C.).

EXAMPLE III

About 100 grams of the residue obtained in Example II by distilling off the 2-methyl phenol was added to 150 grams of 2-methyl - 2,4 - pentanediol in a distillation kettle. A 2 ft. helix-packed column was fitted to the ketle and the distillation commenced at 100 mm. Hg pressure at 19:1 reflux ratio. All but 16 grams were distilled over at 138–143° C. (at 100 mm. Hg). Analysis of both distillate and residue showed the following:

|  | 2-methyl-2,4-pentanediol, percent | 2,6-dimethyl phenol, percent | 2-methyl phenol, percent | 3-methyl phenol, 4-methyl phenol, percent |
|---|---|---|---|---|
| Distillate, 234 grams | 60.3 | 39.7 | Trace | Trace |
| Residue, 16 grams | 57.1 | <0.1 | 0.3 | 42.6 |

The diol was then separated from the 2,6-dimethyl phenol by steam distillation. 89% of the 2,6-dimethyl phenol was recovered and vapor phase chromatography analysis showed it to be essentially 100% pure.

To further illustrate the azeotropic separation techniques of the invention, a higher boiling point mixture of alkyl phenols having a difference in polarity was selected as follows:

|  | B. P., ° C. |
|---|---|
| 2,3-dimethyl phenol | 218 |
| 3,5-dimethyl phenol | 219.5 |
| 2,3,6-trimethyl phenol | 220 |

As can be readily seen by examination of the boiling points, conventional fractionation is not a practical means of separation of 3,5-dimethyl phenol from the other two alkyl phenols. However, the polarity of the 3,5-dimethyl phenol, due to the meta-position of the methyl groups, probably accounts for the results achieved upon using the azeotropic techniques of the invention. This separation is illustrated below.

EXAMPLE IV

To a distillation kettle was charged 100 grams of a mixture of alkyl phenols as follows:

|  | Percent |
|---|---|
| 3,5-dimethyl phenol | 60 |
| 2,3-dimethyl phenol | 30 |
| 2,3,6-trimethyl phenol | 10 |

150 grams of 1,3-propanediol were added and a 2 ft. helix-packed column attached. The distillation was carried out at 50 mm. Hg pressure and 19:1 reflux ratio. About 80 grams was collected in the first three cuts which boiled at 135–140° C. (50 mm. Hg). About 100 grams was collected in cuts 4–7 boiling at 140–143° C. (50 mm. Hg). This second portion was analyzed by vapor phase chromatography after removal of the diol by steam distillation and the results found were as follows:

| 3,5-dimethyl phenol | percent | 98.1 |
|---|---|---|
| 2,3-dimethyl phenol | do | 1.9 |
| 2,3,6-trimethyl phenol |  | Trace |

1,3-butanediol was also used as an azeotroping agent with a phenol mixture similar to that above. The separation gave a 92.5% 3,5-dimethyl phenol with 7.5% 2,3-dimethyl phenol.

The foregoing has illustrated a novel process for the separation of close boiling compounds which have heretofore been very difficult, if not possible, to satisfactorily separate. The process uses a polar alkane diol to preferentially azetrope with the least polar alkyl phenol.

What is claimed is:

1. A process for the separation of a mixture of alkyl phenols having close boiling points but having at least one alkyl phenol that is less polar than the others, which comprises:
   (a) adding to the mixture of alkyl phenols an alkane diol having from 2–6 carbon atoms and a boiling point within 20° C. of the said less polar alkyl phenol to form an azeotrope of the diol and the said less polar alkyl phenol; and
   (b) distilling the mixture to separate the azeotrope from said mixture.

2. The process of claim 1 wherein the mixture of alkyl phenols comprise 2,6-dimethyl phenol and monomethyl phenols and the azeotropic distillation is carried out at a pressure of from 50 mm. Hg to atmospheric pressure.

3. The process of claim 2 wherein the diol is an alkane diol having from 2–6 carbon atoms and the said diol forms an azeotrope with the said 2,6-dimethyl phenol.

4. The process of claim 3 wherein the alkane diol is selected from the class consisting of ethylene glycol, 1,2-propanediol, 1,3-butanediol and 2-methyl-2,4-pentanediol.

5. The process of claim 3 wherein the alkane diol is ethylene glycol.

6. The process of claim 3 wherein the alkane diol is 1,2-propanediol.

7. The process of claim 1 wherein the mixture of alkyl phenols comprises 2,3-dimethyl phenol, 3,5-dimethyl phenol, and 2,3,6-trimethyl phenol and the azeotropic distillation is carried out at a pressure of from 50 mm. Hg to atmospheric pressure.

8. The process of claim 7 wherein the diol is an alkane diol having from 2–6 carbon atoms and the said diol forms azeotropes with the said 2,3-dimethyl phenol and 2,3,6-trimethyl phenol.

9. The process of claim 8 wherein the alkane diol is selected from the class consisting of 1,3-propanediol and 1,3-butanediol.

References Cited

UNITED STATES PATENTS

| 3,105,018 | 9/1963 | Freure | 203—64 |
| 3,331,755 | 7/1967 | Neuworth | 203—64 |

WILBUR L. BASCOMB, Jr., *Primary Examiner.*